(12) United States Patent
Abe

(10) Patent No.: US 6,388,421 B2
(45) Date of Patent: May 14, 2002

(54) CONTROL SYSTEM AND CONTROL METHOD OF COMBINED SYSTEM HAVING SECONDARY BATTERY AND GENERATOR

(75) Inventor: Takaaki Abe, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/814,827

(22) Filed: Mar. 23, 2001

(30) Foreign Application Priority Data

Mar. 24, 2000 (JP) ........................................ 2000-085155

(51) Int. Cl.[7] .............................................. H01M 10/46
(52) U.S. Cl. ........................................ 320/104; 320/132
(58) Field of Search ................................. 320/103, 104, 320/132; 180/65.1, 65.2, 65.3, 65.4; 340/635, 636; 429/61, 90

(56) References Cited

U.S. PATENT DOCUMENTS

| | | | |
|---|---|---|---|
| 4,194,146 A | * | 3/1980 | Patry et al. |
| 5,115,183 A | * | 5/1992 | Kyoukane et al. |
| 5,778,997 A | * | 7/1998 | Setaka et al. |
| 5,939,861 A | * | 8/1999 | Joko et al. |
| 6,163,135 A | * | 12/2000 | Nakayama et al. |
| 6,232,748 B1 | * | 5/2001 | Kinoshita |

* cited by examiner

Primary Examiner—Edward H. Tso
(74) Attorney, Agent, or Firm—Foley & Lardner (57) ABSTRACT

A control system and a control method of a combined system having a secondary battery 15 and a fuel cell power generation system 12 are disclosed. wherein a vehicle controller 20 repeats a secondary battery-charging running mode wherein electric power output of the power generation system 12 is supplied to the secondary battery 15 and a motor 11, and a secondary battery-discharging running mode wherein electric power output of the power generation system 12 and electric power output discharged from the secondary battery 15 are supplied to the motor 11. In such a control, the amounts of electric power output of the power generation system 12 and electric power output discharged from the secondary battery 15 are set to values to provide the maximum total efficiency that is computed in conjunction with a charging efficiency of the secondary battery 15 during the secondary battery-charging running mode.

10 Claims, 6 Drawing Sheets

CONTROL SYSTEM AND CONTROL METHOD OF COMBINED SYSTEM HAVING SECONDARY BATTERY AND GENERATOR

BACKGROUND OF THE INVENTION

The present invention relates to a control system and control method of a combined system having a secondary battery and a generator and, more particularly, to allocation control of such a combined system.

In recent years, various research and development have been attempted to provide an electric vehicle installed with a secondary battery and a generator (electric power generator) as a combined power source for a drive motor and accessories with a view to improving an energy efficiency of the combined power source.

In such an electric vehicle, a fuel cell power generation system has been selected as an electric power generator to be installed.

In vehicles equipped with fuel cell power generation systems and secondary batteries, there are two types of running modes.

One typical example is a first mode wherein electric power output of the fuel cell power generation system is supplied to the drive motor, the accessories and the secondary battery, with the first mode being substantially continued even when the vehicle comes to a stop. This mode will be hereinafter referred to as a secondary battery-charging running mode.

The other mode is to supply both electric power outputs of the secondary battery and the electric power generator to the drive motor and the accessories, while the secondary battery being not charged by the electric power generator. This mode will be hereinafter referred to as a secondary battery-discharging running mode.

In such a vehicle having these two running modes, it is required to increase a total efficiency of the fuel cell power generation system and the secondary battery in respective running modes with a view to improving an energy consuming performance.

SUMMARY OF THE INVENTION

Figure 4:
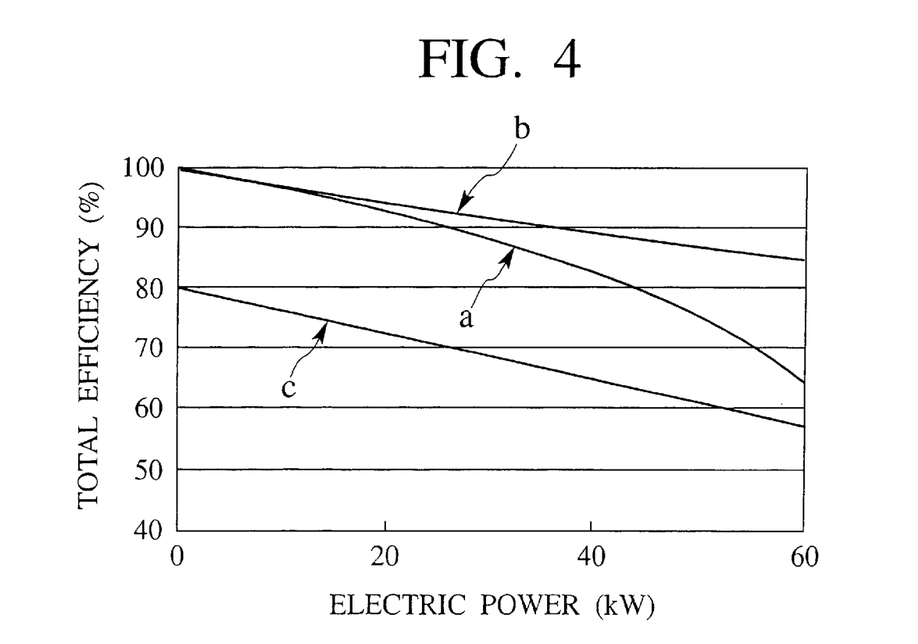
FIG. 4 is a graph for illustrating the characteristic of charging and discharging efficiencies of an secondary battery and an efficiency of electric power output of an fuel cell power generation system investigated by the present inventor.

In view of the investigation by the present inventor, the secondary battery and the fuel cell power generation system have operating efficiencies of which characteristics are shown in FIG. 4.

Since the secondary battery has a Joule's loss due to internal resistance, the operating efficiency will decrease as the amount of electric power output to be charged to or to be discharged from the secondary battery increases as shown by a curve a representing a case for discharging mode and a curve b representing another case for charging mode.

The fuel cell power generation system also has a similar characteristic in that it has the same Joule's loss as that of the secondary battery and, in addition, it is suffered from the operating efficiency of a compressor for supplying oxygen to the fuel cell, with a resultant decrease in the operating efficiency with the increase in the amount of electric power generation output as shown by a curve c in FIG. 4.

For the above reasons, in the event that electric power is supplied to the drive motor and the accessories at a constant rate in the secondary battery-charging running mode, the amount of electric power output of the fuel cell power generation system is caused to increase with the increase in the amount of electric power to be charged to the secondary battery, resulting in a decreased total efficiency of the combined system.

Note should be undertaken here that the total efficiency is typically meant by a total operating efficiency that is obtained when the fuel cell power generation system is operated with fuel, at least a part of the electric power output of the fuel cell power generation system is used for charging the secondary battery, and sequentially the secondary battery is discharged.

In order to avoid a decrease in the total efficiency, it has heretofore been proposed to employ an operating method that decreases the amount of electric power to be charged to the secondary battery when demanded electric power is increased for the drive motor and the accessories.

Figure 8:
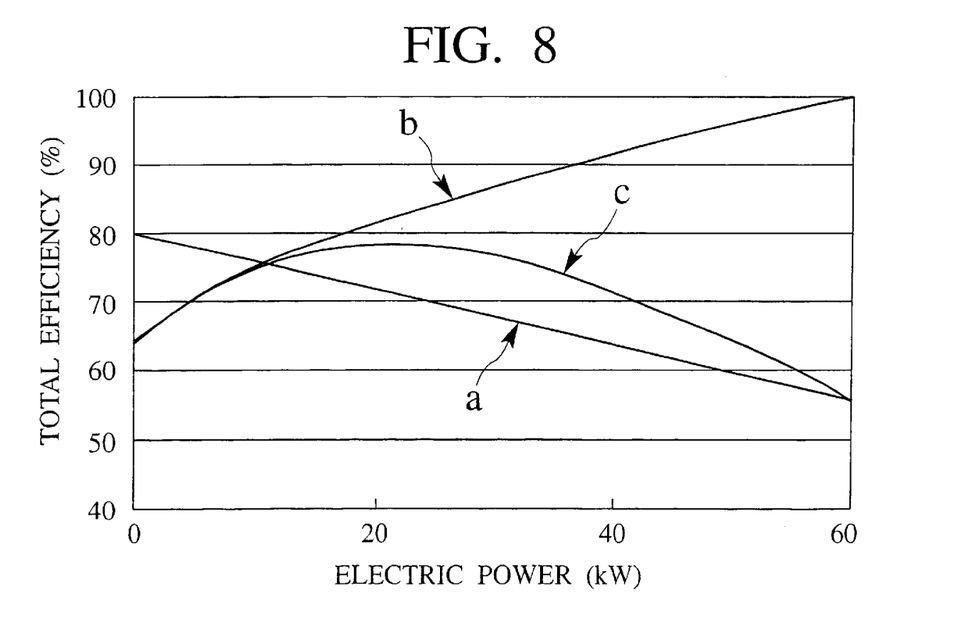
FIG. 8 is a graph for illustrating the characteristics of an efficiency of electric power output of a fuel cell power generation system, and a charging efficiency and the total efficiency of a secondary battery during a secondary battery-discharging running mode investigated by the present inventor.

FIG. 8 shows the relationship between an electric power generation efficiency of the fuel cell power generation system, a discharging efficiency of the secondary battery and the total efficiency with respect to electric power output of the fuel cell power generation system (abscissas of FIG. 8). Here, various curves are derived under a condition wherein demanded electric power for the drive motor and the accessories is 60 KW.

In the secondary battery-discharging running mode, since the sum of electric power output of the fuel cell power generation system and electric power discharged from the secondary battery is supplied to the drive motor and the accessories, the fuel cell power generation system will generate electric power output at a reduced power generation efficiency with the increase in the amount of electric power output produced by the fuel cell power generation system, as shown by a curve a in FIG. 8. In contrast, since the amount of electric power to be discharged from the secondary battery decreases with the increase in the amount of electric power output of the fuel cell power generation system, the discharging efficiency of the secondary battery increases as shown by a curve b in FIG. 8.

This causes the total efficiency of electric power outputs to be supplied from the fuel cell power generation system and the secondary battery to vary along a curve c shown in FIG. 8, with a resultant maximum total efficiency owing to particular relationships between the amount of electric power output of the fuel cell power generation system and the amount of electric power output to be discharged from the secondary battery.

Based on the above particular relationships, the amount of each electric power output of the secondary battery and the fuel cell power generation system is set to respective values for achieving the maximum total efficiency.

Figure 9:
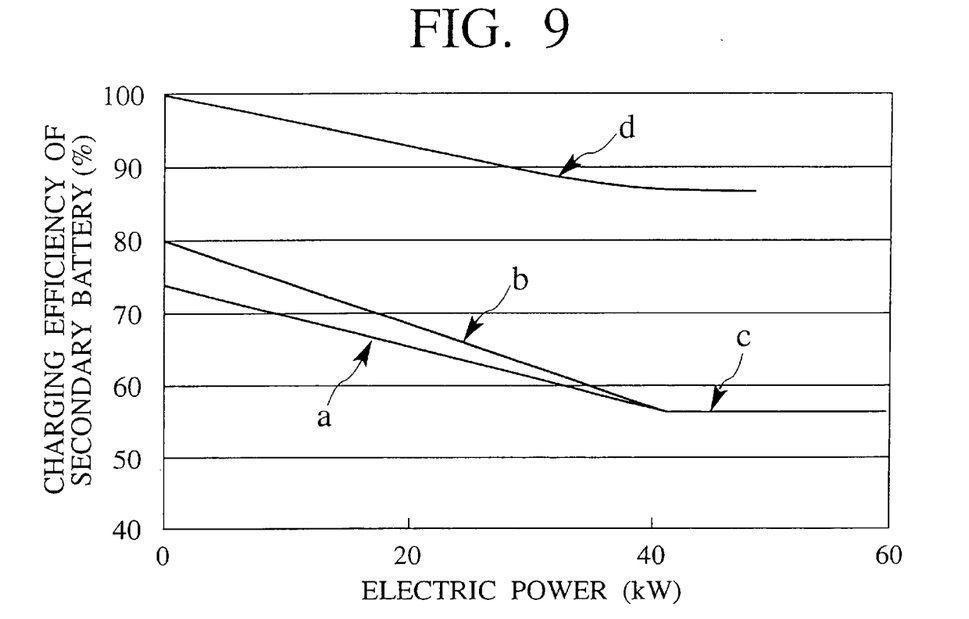
FIG. 9 is a graph for illustrating the characteristics of the charging efficiencies of the secondary battery for each control mode during the secondary battery-charging running mode investigated by the present inventor.

The charging efficiency of the secondary battery varies in the secondary battery-charging running mode as shown in FIG. 9 by controlling the secondary battery. Also, the charging efficiency of the secondary battery, which substantially corresponds to a more actual charging efficiency of the secondary battery when the secondary battery is charged in the combined system, is obtained by multiplying the power generation efficiency of the fuel cell power generation system and a charging efficiency of the secondary battery, both of which are obtained based on actual measurements or the like. The axis of abscissas represents the demanded electric power of the drive motor and the accessories.

In FIG. 9, a curve a indicates the charging efficiency of the secondary battery when the rate of charging the second battery is held constant, a curve b indicates the charging efficiency of the secondary battery when the rate of charging the secondary battery is varied in proportionate to the amount of electric power to be supplied to the drive motor and the accessories, and a curve c indicates the charging efficiency of the secondary battery wherein, when the charging efficiency of the secondary battery is lowered to a given level, the amount of electric power to be charged to the secondary battery is decreased to prevent the charging efficiency of the secondary battery from being lower than the given level.

Further, while the secondary battery is charged with generative power produced by the drive motor during deceleration of the vehicle, the power generation efficiency of the fuel cell power generation system has no relation to the secondary battery and the charging efficiency of the secondary battery to which the generative power is charged varies along a curve d shown in FIG. 9.

In the secondary battery-charging running mode, it has been attempted to combines various controls with a view to improving both the energy consuming performance of the vehicle and the performance of electric power.

By the way, a further research and development revealed that, even when the control is set in a manner discussed above so as to achieve the maximum total efficiency in the secondary battery-discharging running mode, it is difficult to obtain the maximum total efficiency throughout various running conditions of the vehicle. That is, in the above propsed method, the maximum total efficiency cannot be obtained throughout the whole operating conditions wherein electrical energy is produced by the fuel cell power generation system with the use of fuel and is charged to the secondary battery, which subsequently discharges electric power output.

Here, a reference will be given to FIG. 10, which shows various curves for total efficiencies which are obtained when the amount of electric power to be supplied to the drive motor and the accessories in the secondary battery-discharging running mode is 60 KW. The axis of abscissas represents the electric power output of the fuel cell power generation system and plural curves are plotted for each efficiency in cases where the secondary battery is charged in the secondary battery-charging running mode.

Figure 10:
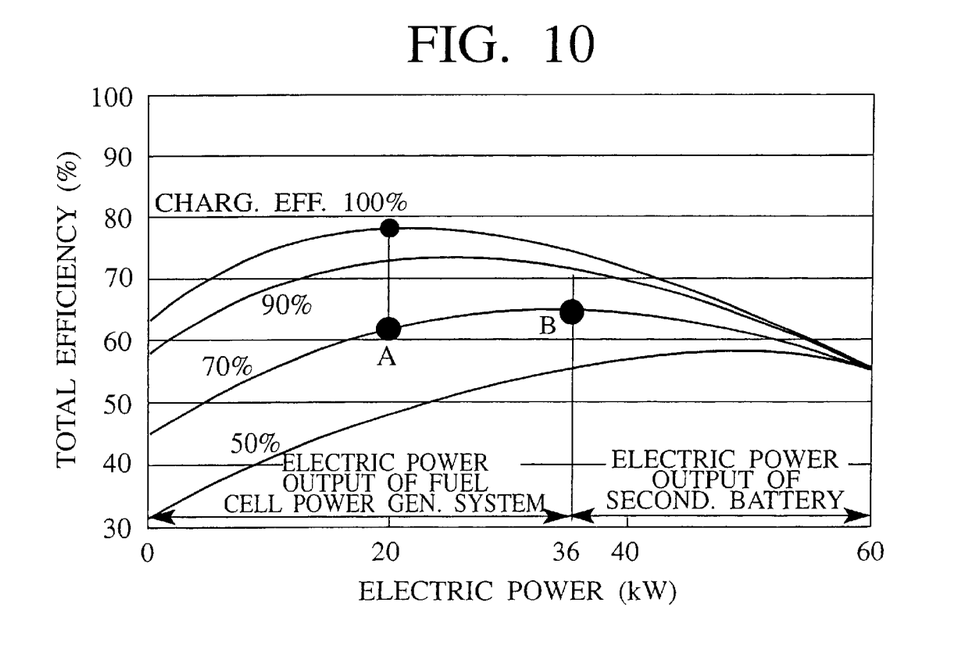
FIG. 10 is a graph showing the characteristics for illustrating influences of the charging efficiencies of the secondary battery with respect to the respective total efficiencies during the secondary battery-discharging running mode investigated by the present inventor.

As will be apparent from FIG. 10, the total efficiency with respect to electric power output of the fuel cell power generation system (abscissas of FIG. 10) varies responsive to the efficiencies attained when the secondary battery is charged. For example, in the event that the efficiency is 70% when the secondary battery is charged, the maximum level of the total efficiency becomes 65% as shown by the curve B.

In the case that in a control system where a charging efficiency of the secondary battery is not considered, it is required for the charging efficiency of the secondary battery to reach 100% on a characteristic curve such that the maximum total efficiency is obtained when electric power output of the fuel cell power generation system is 20 KW and electric power output discharged from the secondary battery is 40 KW (i.e., 60 KW–20 KW).

However, assuming that the charging efficiency of the secondary battery is 70%, the maximum total efficiency is obtained at a point B in FIG. 10 under the conditions wherein electric power output of the fuel cell power generation system is 36 KW and electric power output discharged from the secondary battery is 24 KW (i.e., 60 KW–36 KW). In this event, the total efficiency at the point A, wherein electric power output of the fuel cell power generation system is 20 KW and electric power output discharged from the secondary battery is 40 KW, becomes smaller than the maximum total efficiency that would be expected.

Thus, the charging efficiency of the secondary battery varies in the secondary battery-charging running mode responsive to the running conditions of the vehicle and the total efficiency has the maximum point that varies responsive to the charging efficiency of the secondary battery in the secondary battery-discharging running mode.

It is therefore an object of the present invention to overcome the above situations investigated by the present inventor and to provide a control system and a control method of a combined system having a secondary battery and an electric power generator to provided the maximum total efficiency at substantially all times throughout operating conditions wherein, even when a charging efficiency of the secondary battery varies, the electric power generator generates electric energy that is charged to the secondary battery which then discharges electric power output.

In the present invention, a control system controls a combined system having a secondary battery and an electric power generator, and serving as a power supply for a load, wherein the secondary battery is charged by use of the electric power generator. The control system is provided with: a charging efficiency calculating section calculating a charging efficiency of the secondary battery in conjunction with an electric power output of the electric power generator; a total efficiency data calculating section calculating total efficiency data in response to a demanded electric power of the load; and an electric power supply controlling section controlling allocation of an electric power output of the secondary battery and an electric power output of the electric power generator both to be supplied to the load. The electric power supply controlling section sets an electric power output of the secondary battery and an electric power output of the electric power generator both to be supplied to the load on the basis of the charging efficiency and the total efficiency data.

In other words, a control system controlling such a combined system of the present invention is provided with: means for calculating a charging efficiency of the secondary battery in conjunction with an electric power output of the electric power generator; means for calculating total efficiency data in response to a demanded electric power of the load; and means for controlling allocation of an electric power output of the secondary battery and an electric power output of the electric power generator both to be supplied to the load, while setting an electric power output of the secondary battery and an electric power output of the electric power generator both to be supplied to the load on the basis of the charging efficiency and the total efficiency data.

Besides, a method of controlling such a combined system of the present invention calculates a charging efficiency of the secondary battery in conjunction with an electric power output of the electric power generator, calculates total efficiency data in response to a demanded electric power of the load, and controls allocation of an electric power output of the secondary battery and an electric power output of the electric power generator both to be supplied to the load, while setting an electric power output of the secondary battery and an electric power output of the electric power generator both to be supplied to the load on the basis of the charging efficiency and the total efficiency data.

Other and further features, advantages, and benefits of the present invention will become more apparent from the following description taken in conjunction with the following drawings.

DETAILED DESCRIPTION OF THE PREFERRED EMBODIMENT

Hereinafter, a control system and control method of a combined system having a secondary battery and an electric power generator according to one embodiment of the present invention will be described in detail in reference to the attached drawings.

Figure 1:
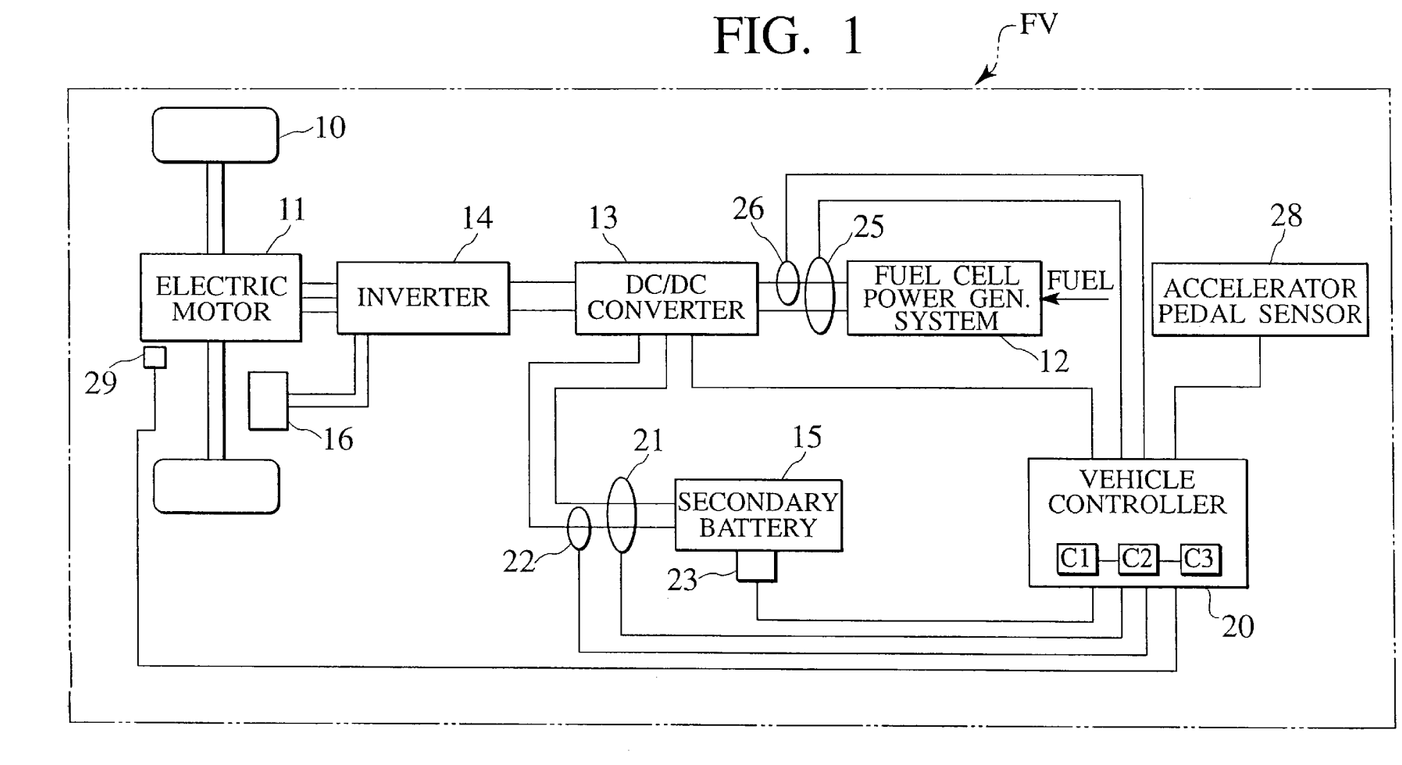
FIG. 1 is a block diagram for illustrating a preferred embodiment of a control system according to the present invention, with the control system being shown as applied to a fuel cell powered vehicle.

Referring to FIG. 1, there is shown a preferred embodiment of a control system and control method of a combined system having a secondary battery and an electric power generator according to the present invention, with the control system being shown as applied to a fuel cell powered vehicle FV.

In FIG. 1, the fuel cell powered vehicle FV includes an electric motor 11 that serves as a drive source for driving wheels 10, an electric power supply including a fuel cell power generation system 12 and a secondary battery 15, and a vehicle controller 20 that controls the fuel cell power generation system 12 and the secondary battery 15 responsive to running conditions of the vehicle.

The fuel cell power generation system 12 operates such that it produces hydrogen gas by reforming fuel composed of methanol and hydrogen is reacted with oxygen in a fuel cell to produce electric power output.

The fuel cell power generation system 12 is connected through a DC/DC converter 13 to an inverter 14, which converts a DC output to an AC output which is applied to the electric motor 11 and auxiliary equipments or accessories 16 and is also connected through the DC/DC converter 13 to the secondary battery 15.

The DC/DC converter 13 is connected to and controlled by a vehicle controller 20, which serves to produces command signals to switch-over between a first operating mode wherein electric power output of the fuel cell power generation system 12 is supplied to the electric motor 11, accessories 16 and the secondary battery 15 and a second operating mode wherein both electric power output of the fuel cell power generation system 12 and electric power output discharged from the secondary battery 15 are supplied to the electric motor 11 and the accessories 16.

With such a control of power delivery, electric power output of the fuel cell power generation system 12 is raised or lowered in voltage and is supplied to the secondary battery 15 and to the electric motor 11 and the accessories 16 through the inverter 14.

Electric power of the secondary battery 15 is supplied through the DC/DC converter 13 to the inverter 14, from which AC power output is supplied to the electric motor 11 and the accessories 16. When the electric motor 11 generates generative power output during deceleration of the vehicle, generative power output is charged to the secondary battery 15 through the inverter 14 and the DC/DC converter 13.

The vehicle controller 20 is connected to an accelerator pedal sensor 28 that detects a depressed displacement of an accelerator pedal to produce an output signal indicative thereof, and a rotation speed sensor 29 that detects rotational speed of the electric power 11 to produce an output signal indicative thereof. Thus, the vehicle controller 20 computes demanded amount of electric power responsive to operating parameters such as depressed displacement of the accelerator pedal and the rotational speed of the motor 11.

The vehicle controller 20 is also connected to a voltage sensor 21 that detects the total amount of output voltage of the second battery 15 to produce a detection signal indicative thereof, an electric current sensor 22 that detects electric current to produce a detection signal indicative thereof, and a temperature sensor 23 that detects temperature of the secondary battery 15 to produce a detection signal indicative thereof. The vehicle controller 20 computes the remaining capacity (state of charge) SOC charged in the secondary battery 15, the amount of electric power to be discharged, the amount of electric power to be charged, an electrical discharging efficiency and an electrical charging efficiency responsive to these detection signals.

Further, the vehicle controller 20 is also connected to a voltage sensor 25 that detects the total voltage of electric power output of the fuel cell power generation system 12 to produce a detection signal indicative thereof, and an electric current sensor 26 that detects electric current of the fuel cell power generation system 12 to produce a detection signal indicative thereof. The vehicle controller 20 computes electric power generation efficiency responsive to these detection signals.

Incidentally, a charging efficiency calculating section C1 of the vehicle controller 20 calculates the charging efficiency of the secondary battery 15, a total efficiency data calculating section C2 of the vehicle controller 20 calculates the total efficiency data of the combined system having the secondary battery 15 and the fuel cell power generation system 12, and an electric power supply controlling section C3 of the vehicle controller 20 controls the allocation of the electric power output of the secondary battery 15 and the electric power output of the fuel cell power generation system 12 as an electric power generator.

With such a structure of the fuel cell powered vehicle FV, the control system of the invention repeatedly controls the fuel cell power generation system 12 and the secondary battery 15 in "a secondary battery-discharging running mode" wherein both electric power output of the fuel cell power generation system 13 and electric power output discharged from the secondary battery 15 are supplied to the electric motor 11 and the accessories 16, while the secondary battery 15 being not charged by the fuel cell power generation system 12, and "a secondary battery-charging running mode" wherein electric power output of the fuel cell power generation system 12 is supplied to the electric motor 11 and the accessories 16 and is also supplied to the secondary battery 15 for charging the same, responsive to running conditions of the vehicle.

Further, during deceleration of the vehicle, the electric motor 11 produces generative power that is supplied to and charged in the secondary battery 15.

Figure 2:
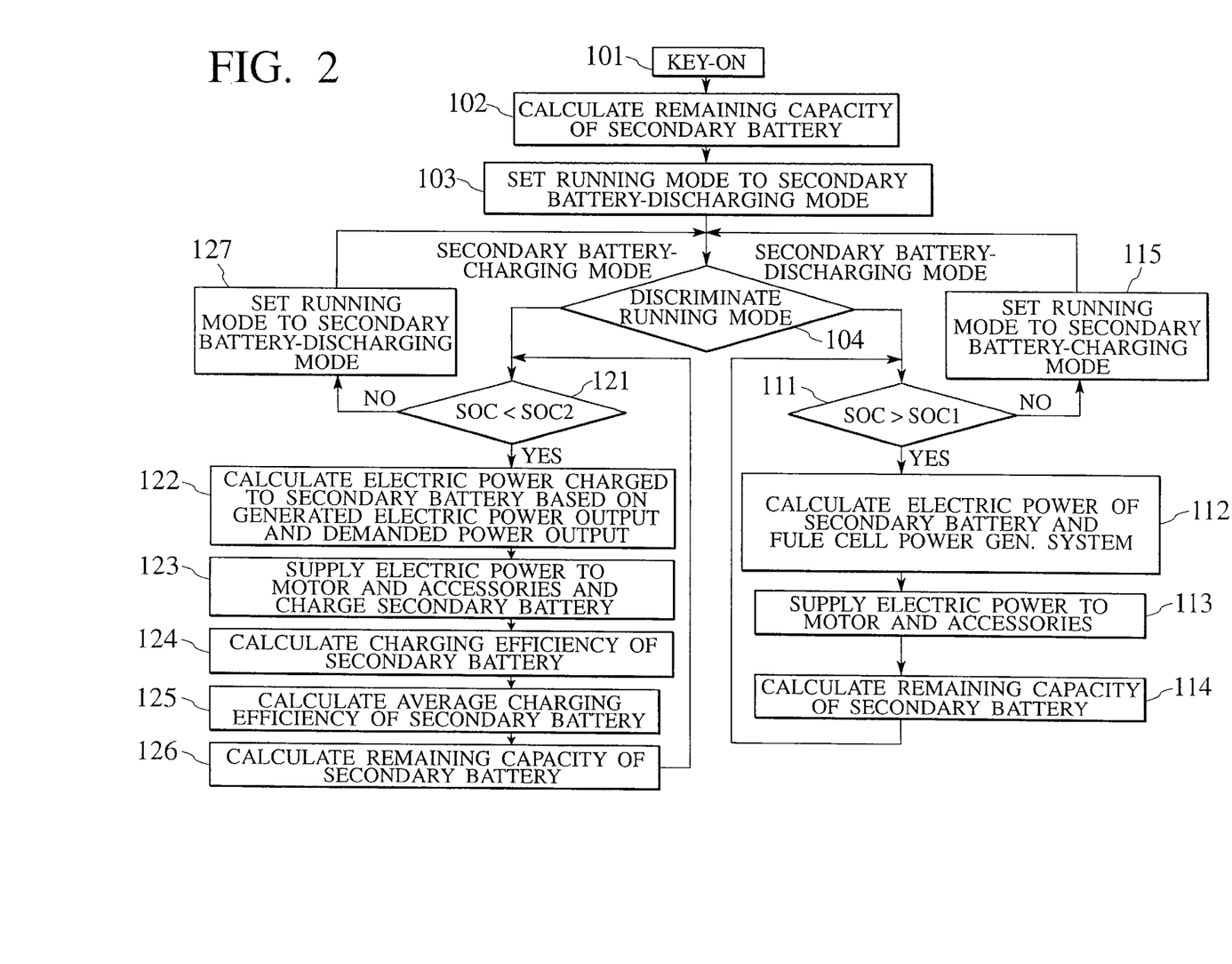
FIG. 2 is a general flow diagram for illustrating the basic sequence of control achieved by the control system shown in FIG. 1.

Now, a control sequence of the vehicle controller 20 will be described with reference to FIG. 2 which illustrates a general flow diagram for illustrating the basic sequence of operation of the vehicle controller 20.

At the start, i.e., when a key (not shown) is turned on in step S101 for beginning operation of the vehicle, remaining capacity SOC of the secondary battery 15 is computed on the basis of the total output voltages of the secondary battery 15 in step S102.

In step 103, "the secondary battery-discharging running mode" is set in the vehicle controller 20.

In step 104, the running mode is again checked whether the current running mode is in "the secondary battery-discharging running mode" or in "the secondary battery-charging running mode".

When the vehicle controller 20 is set in "the secondary battery-discharging running mode", the operation goes to step 111 wherein it is checked whether the remaining capacity SOC of the secondary battery 15 is greater than a lowermost preset value SOC1.

When the remaining capacity SOC of the secondary battery 15 is greater than the lower limit SOC1, the operation goes to step 112 while continuously maintaining the vehicle controller in the "secondary battery-discharging running mode", and electric power output to be discharged from the secondary battery 15 and electric power output to be generated by the fuel cell power generation system 12 are computed on the basis of the demanded electric power and the charging efficiency of the secondary battery 15 last obtained in "the secondary battery-charging running mode". Note should be undertaken that the charging efficiency of the secondary battery 15 in an initial sequential flow is set to an initial preset value of for, example, 90%.

In step 113, the DC/DC converter 13 is controlled such that both electric power output discharged from the secondary battery 15 and electric power output of the fuel cell power generation system 12 are supplied to the electric motor 11 and the accessories 16.

In the next step 114, the remaining capacity SOC of the secondary battery 15 is computed by calculating the total voltages of the secondary battery 15 or total values of the discharged electric current thereof, and the operation returns to the step 111.

In the step 111, when the remaining capacity SOC of the secondary battery 15 is below the lower limit SOC1 of the preset value, the operation returns to step 115 to prevent further discharging of the secondary battery 15.

In step 115, the running mode is switched over to the "the secondary battery-charging running mode", and the operation returns to step 104.

In step 104, when the running mode is confirmed in "the secondary battery-charging running mode", the operation goes to step 121, wherein it is checked whether the remaining capacity of the secondary battery 15 is below the upper limit SOC2 of the preset value.

When the remaining capacity SOC of the secondary battery 15 is below the upper limit SOC2, "the secondary battery-charging running mode" is continued and the operation goes to step 122.

In step 122, allocation of electric power output of the fuel cell generation system 12 is set in electric power output demanded by the electric motor and the accessories, and electric power to be supplied to the secondary battery 15, within an allowable range determined by given electric power generation efficiency of the fuel cell generation system 12. In step 123, also, electric power output is supplied to the electric motor 11 and the accessories 16 responsive to allocation of electric power generation and is also supplied to the secondary battery 15 that is charged.

In step 124, the charging efficiency of the secondary battery 15 is computed in a predetermined time sequence during a time period when the secondary battery 15 is charged and, in step 125, an average charging efficiency of the secondary battery 15 is obtained in correspondence with the predetermined time sequence.

In step 126, further, remaining capacity SOC of the secondary battery 15 is computed and the operation returns to step 121.

In step 121, when remaining capacity SOC of the secondary battery 15 exceeds the upper limit SOC2, further charging of the secondary battery 15 is not required and the operation returns to step 127 wherein the running mode is set to "the secondary battery-discharging running mode". Thereafter, the operation returns to step 104.

Figure 3:
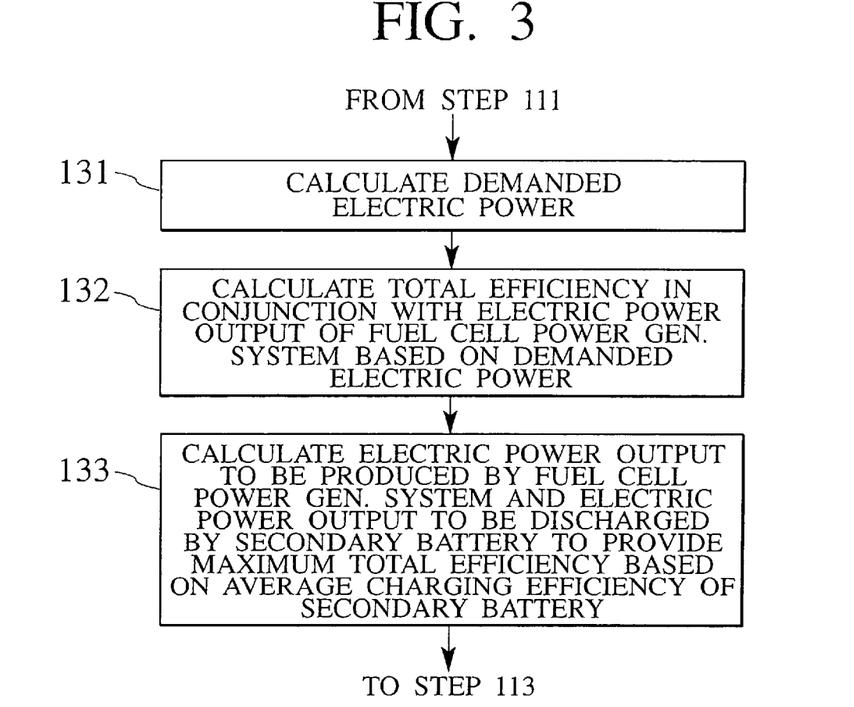
FIG. 3 shows a flow diagram for illustrating the basic sequence for computing electric power output discharged by a secondary battery and electric power output produced by a fuel cell power generation system.

FIG. 3 is a flow diagram for illustrating the basic sequence of computing electric power output discharged from the secondary battery 15 and electric power output generated by the fuel cell power generation system 12 in step 112, in detail.

In initial step 131, the vehicle controller 20 computes electric power output demanded by the electric motor 11 and the accessories 16 on the basis of running conditions estimated by calculating given operating parameters such as the depressed displacement value detected by the accelerator pedal sensor 28.

In the next step 132, the total efficiency (total efficiency data) in conjunction with the amount of electric power output generated by the fuel cell power generation system 12 is computed from demanded electric power output.

Figure 5:
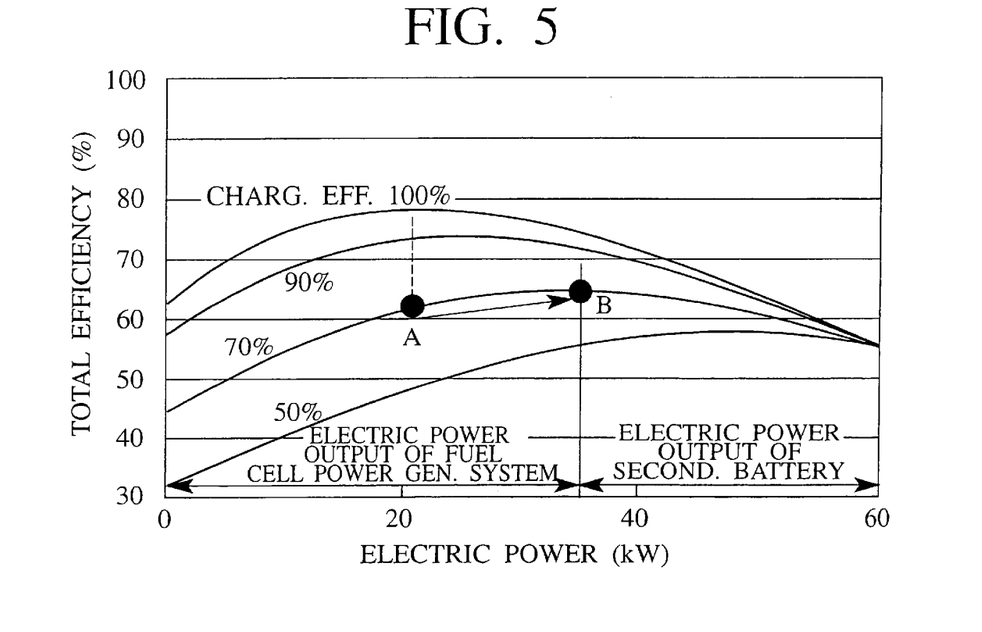
FIG. 5 is a graph for illustrating the characteristics of total efficiencies plotted for respective charging efficiencies of the secondary battery in conjunction with the amounts of electric power output of the fuel cell power generation system.

Here, the total efficiency in conjunction with the amount of electric power generation output of the fuel cell power generation system 12 is derived as shown in FIG. 5, while the charging efficiency of the secondary battery 15 being treated as the parameters, on the basis of the relationship between electric power output discharged from the secondary battery 15 and an efficiency as shown by a curve a in FIG. 4 and the relationship between electric power output of the fuel cell power generation system 12 and an efficiency as shown by a curve c if FIG. 4. Also, FIG. 5 shows the same characteristic curves for the charging efficiencies, when the demanded electric power is 60 KW, as shown in FIG. 10, with respect to electric power output of the fuel cell power generation system (abscissas of FIG. 10).

In the succeeding step 133, electric power output to be generated by the fuel cell power generation system 12 and electric power output to be discharged from the secondary battery 15 are computed to obtain the maximum total efficiency. This is obtained by computing electric power output to be generated by the fuel cell power generation system 12 to provide the maximum value in the characteristic curve which corresponds to average charging efficiency of the secondary battery 15 that has been obtained in the secondary battery-charging running mode as shown in FIG. 5. Also, it is to be noted that electric power output to be discharged from the secondary battery 15 equals to the sum wherein electric power output of the fuel cell power generation system 12 is subtracted from demanded electric power output.

With such a computation, when demanded electric power is 60 KW and charging efficiency is 70%, the total efficiency is improved from a point A of 62%, which is obtained in a control method disregarding charging efficiency of the secondary battery, to a point B of 65% as viewed from graph of FIG. 5.

Figure 6:
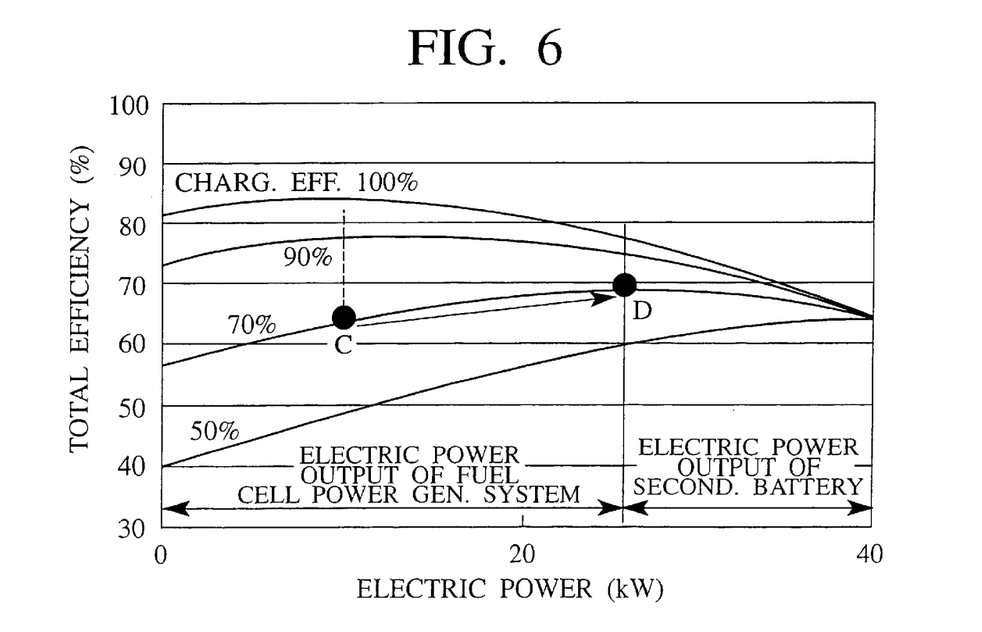
FIG. 6 is a graph for illustrating the characteristics of total efficiencies plotted for respective charging efficiencies of the secondary battery in conjunction with the amounts of electric power outputs from the fuel cell power generation system.
Figure 7:
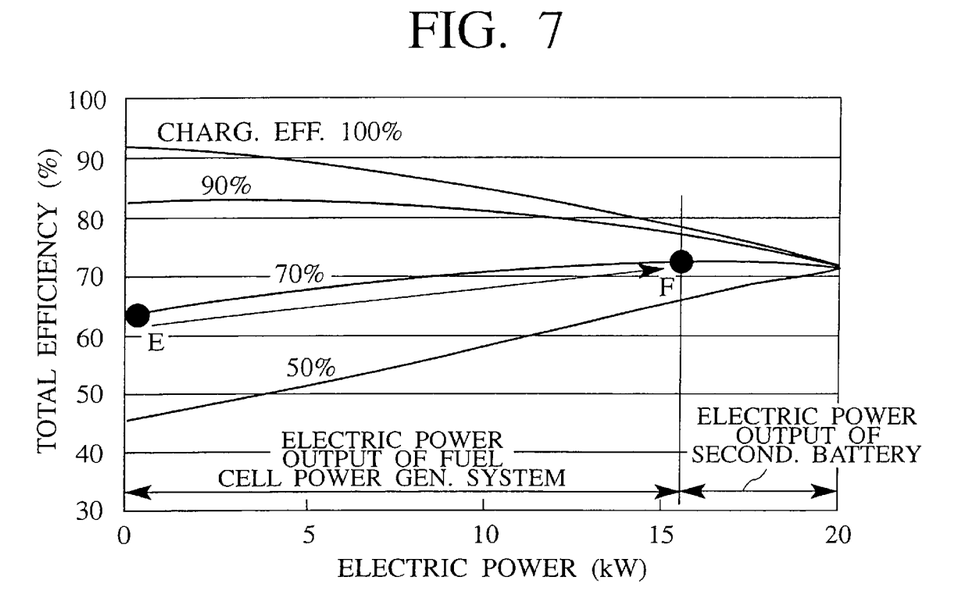
FIG. 7 is a graph for illustrating the characteristics of total efficiencies plotted for respective charging efficiencies of the secondary battery in conjunction with the amounts of electric power outputs from the fuel cell power generation system.

Similarly, FIGS. 6 and 7 show the total efficiencies of a case wherein demanded electric power is 40 KW and a case wherein demanded electric power is 20 KW, with respect to electric power output of the fuel cell power generation system (each abscissas thereof) respectively. As seen in FIG. 6, when the charging efficiency of the secondary battery 15 is 70%, the total efficiency is improved from a point C of 62% to a point D of 69%. As shown in FIG. 7, the total efficiency is improved from a point E of 65% to a point F of 73%. In the event that the charging efficiency of the secondary battery 15 is below 70%, the total efficiency is improved in a further wide range.

Incidentally in the illustrated embodiment, the characteristic data as shown in each of FIGS. 4 to 7 have been stored in memories (not shown) in the controller 20 as a table or the like.

The aforesaid steps 124 and 125 are executed by the charging efficiency computing section C1, the steps 131 and 132 are executed by the total efficiency data computing section C2 and the steps 133 and 113 are executed by the electric power supply controlling section C3.

With such a structure of the preferred embodiment discussed above, the secondary battery-discharging running mode and the secondary battery-charging running mode are alternately repeated so as to maintain the remaining capacity of the secondary battery 15 in a range between the preset values SOC1 and SOC2 and, during this time interval, electric power output of the fuel cell power generation system 12 and electric power output discharged from the secondary battery 15 are set to respective values so as to maintain the efficiency computed in conjunction with charging efficiency of the secondary battery 15 in the secondary battery-charging running mode at the maximum level. Accordingly, it is possible to highly improve the total efficiency throughout the whole operating conditions wherein electric power output generated by the fuel cell power generation system 12 using fuel is charged to the secondary battery 15 and, in subsequent step, the secondary battery 15 discharges electric power output, to a higher level.

While, in the illustrated embodiment, the load has been shown and described as comprising the electric motor 11 and the accessories 16, the load is not limited hereto.

Further, although the secondary battery-discharging running mode and the secondary battery-charging running mode have been described as being alternately repeated so as to maintain the remaining capacity of the secondary battery 15 within a range between the preset values SOC1 and SOC2, the aforesaid two running modes may be switched over in suitable sequences, if desired, as long as the remaining capacity is maintained in the range between the capacity levels SOC1 and SOC2.

Also, although the fuel cell power generation system has been described as the type wherein methanol is reformed to produce hydrogen which is supplied to the fuel cell, the fuel cell power generation system is not limited thereto but may be modified such that gasoline is used or hydrogen gas is directly supplied to the fuel cell to produce electrical power output.

In addition, although the remaining capacity SOC of the secondary battery 15 has been described as being computed in steps 102, 114 or 126 in the flow chart, the remaining capacity may be computed on the basis of the total voltage of the secondary battery 15 or may be read out from the remaining capacity of the secondary battery 15 that has been stored in a memory (not shown) in the controller 20 when the key is off from the fuel cell powered vehicle.

Further, the initial value of the charging efficiency of the secondary battery 15 in initial sequences from the key-on operation to step 112 may be similarly read out from the charging efficiency of the secondary battery 15 that has been stored in the last key-off operation in a memory (not shown) in the controller 20.

Further, although parameters such as the remaining capacity SOC of the secondary battery 15 and the temperature of the secondary battery 15 are omitted from the charging and discharging efficiencies of the secondary battery 15 in FIG. 4, since the charging and discharging efficiencies vary responsive to the remaining capacity SOC and the temperature of the secondary battery 15, characteristic curves for the charging and discharging efficiencies of the secondary battery 15 may be prepared in conjunctions with the remaining capacity SOC and the temperature, respectively, resulting in a further improved precise control.

While the electric power generation system has been shown and described, in the illustrated embodiment, as comprising the fuel cell power generating system, the present invention is not limited thereto and the present invention may also be applied to a case wherein the electric power generator comprises an electrical power generator of the type driven by an engine.

According to a feature of the present invention, since the amounts of electric power outputs of the secondary battery and the electric power generator to be supplied to the load are set in conjunction with the charging efficiency of the secondary battery in the secondary battery-charging running mode, allocation of electric power of the secondary battery and electric power of the electric power generator with respect to the demanded electric power is determined so as to improve the total efficiency throughout the operating conditions wherein the secondary battery is charged and is then discharged. With this determination, energy consuming efficiency is improved even when the electric power generator includes any types of electric power generators such as a fuel cell power generation system or an electric power generator driven by an engine.

According to another feature of the present invention, since the total efficiency data is computed for each charging efficiency responsive to the demanded electric power and respective electric power outputs of the secondary battery and the electric power generator are set to respective values to provide the maximum total efficiency in the whole total efficiency data corresponding to the actual charging efficiencies, it is possible to provide the maximum total efficiency throughout an operating sequence wherein the secondary battery is charged and is then discharged.

According to another feature of the present invention, since the control system employs an average value of charging efficiencies obtained when the secondary battery is charged with electric power generated by the electric power generator, it is possible to reduce in load for computing the amounts of electric power of the secondary battery and electric power of the electric power generator to be supplied to the load responsive to the charging efficiencies as compared to a case wherein a computing step is achieved by directly using efficiencies that varies with variations in time.

According to another feature of the present invention, in a vehicle having a drive motor adapted to be driven by electric power outputs of the secondary battery and the electric power generator, it is possible to maintain the remaining capacity of the secondary battery within a suitable range for thereby improving the total efficiency by alternately repeating the first running mode wherein the vehicle runs during charging the secondary battery and the second running mode wherein the vehicle runs during discharging the secondary battery. With such operation, the secondary battery is effectively utilized and deterioration of the secondary battery is prevented, with a resultant decrease in fuel consumption.

The entire content of a Patent Application No. TOKUGAN 2000-85155 with a filing date of Mar. 24, 2000 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A control system controlling a combined system having a secondary battery and an electric power generator, and serving as a power supply for a load, the secondary battery being charged by use of the electric power generator, the control system comprising:
    a charging efficiency calculating section calculating a charging efficiency of the secondary battery in conjunction with an electric power output of the electric power generator;
    a total efficiency data calculating section calculating total efficiency data in response to a demanded electric power of the load; and
    an electric power supply controlling section controlling allocation of an electric power output of the secondary battery and an electric power output of the electric power generator both to be supplied to the load;
    wherein the electric power supply controlling section sets an electric power output of the secondary battery and an electric power output of the electric power generator both to be supplied to the load on the basis of the charging efficiency and the total efficiency data.

2. A control system according to claim 1, wherein the total efficiency data calculating section calculates the total efficiency data in response to the demanded electric power of the load, on the basis of an electric power generation efficiency of the electric power generator and a discharging efficiency of the secondary battery, for each charging efficiency of the secondary battery.

3. A control system according to claim 2, wherein the total efficiency corresponds to a total operating efficiency obtained when an electric power output is produced by the electric power generator, the secondary battery is charged by the electric power output, and the secondary battery is discharged.

4. A control system according to claim 1, wherein the electric power supply controlling section sets the electric power output of the secondary battery and the electric power output of the electric power generator both to be supplied to the load so as to provide a maximum total efficiency with respect to corresponding one of the charging efficiency of the second battery while using the total efficiency data.

5. A control system according to claim 1, wherein the charging efficiency calculating section calculates the charging efficiency of the secondary battery in such a manner that an average charging efficiency of the secondary battery is obtained when the secondary battery is charged with an electric power output of the electric power generator.

6. A control system according to claim 1, wherein the secondary battery and the electric power generator are installed in a vehicle and the load includes an electric motor of the vehicle driving the same, and wherein the electric power supply controlling section controls the allocation of the electric power output of the secondary battery and the electric power output of the electric power generator in correspondence with a first running mode wherein the electric power output of the electric power generator is supplied to the load for driving the same and to the second battery for charging the same, and with a second running mode wherein the electric power output of the electric power generator and an electric power output discharged from the secondary battery are supplied to the load for driving the same.

7. A control system according to claim 6, wherein the electric power supply controlling section sets the electric power output of the secondary battery and the electric power output of the electric power generator both to be supplied to the load on the basis of the charging efficiency and the total efficiency data in the first running mode.

8. A control system according to claim 6, wherein the charging efficiency calculating section calculates the charging efficiency of the secondary battery in conjunction with the electric power output of the electric power generator in the second running mode.

9. A control system controlling a combined system having a secondary battery and an electric power generator, and serving as a power supply for a load, the secondary battery being charged by use of the electric power generator, the control system comprising:
    means for calculating a charging efficiency of the secondary battery in conjunction with an electric power output of the electric power generator;
    means for calculating total efficiency data in response to a demanded electric power of the load; and
    means for controlling allocation of an electric power output of the secondary battery and an electric power output of the electric power generator both to be supplied to the load, while setting an electric power output of the secondary battery and an electric power output of the electric power generator both to be supplied to the load on the basis of the charging efficiency and the total efficiency data.

10. A method of controlling a combined system having a secondary battery and an electric power generator, and serving as a power supply for a load, the secondary battery being charged by use of the electric power generator, the method comprising:

calculating a charging efficiency of the secondary battery in conjunction with an electric power output of the electric power generator;

calculating total efficiency data in response to a demanded electric power of the load; and controlling allocation of an electric power output of the secondary battery and an electric power output of the electric power generator both to be supplied to the load, while setting an electric power output of the secondary battery and an electric power output of the electric power generator both to be supplied to the load on the basis of the charging efficiency and the total efficiency data.

* * * * *